(12) United States Patent
Turner et al.

(10) Patent No.: US 7,342,736 B1
(45) Date of Patent: Mar. 11, 2008

(54) METHODS AND DISK DRIVE THAT MEASURE HEAD FLYING HEIGHT AT POWER-ON/OFF

(75) Inventors: Robert Turner, Thornton, CO (US); Richard Martin, Longmont, CO (US); Christine Green, Longmont, CO (US); Stephen Perlmutter, Lafayette, CO (US); Devon Dallmann, Broomfield, CO (US)

(73) Assignee: Maxtor Corporation, Longmont, CO (US)

( * ) Notice: Subject to any disclaimer, the term of this patent is extended or adjusted under 35 U.S.C. 154(b) by 35 days.

(21) Appl. No.: 11/477,033

(22) Filed: Jun. 28, 2006

Related U.S. Application Data

(60) Provisional application No. 60/725,025, filed on Oct. 7, 2005.

(51) Int. Cl.
*G11B 21/02* (2006.01)
*G11B 27/36* (2006.01)
*G11B 19/02* (2006.01)

(52) U.S. Cl. .............................. 360/75; 360/31; 360/69
(58) Field of Classification Search ..................... None
See application file for complete search history.

(56) References Cited

U.S. PATENT DOCUMENTS

| 4,777,544 | A | 10/1988 | Brown et al. ................. 360/75 |
| 7,038,875 | B2 | 5/2006 | Lou et al. ..................... 360/75 |
| 2002/0060868 | A1* | 5/2002 | Lenny et al. .................. 360/31 |
| 2005/0046985 | A1* | 3/2005 | Morinaga et al. ............. 360/31 |
| 2006/0209445 | A1* | 9/2006 | Yamasaki et al. ............. 360/46 |

* cited by examiner

*Primary Examiner*—Andrew L. Sniezek
(74) *Attorney, Agent, or Firm*—Myers Bigel Sibley & Sajovec, P.A.

(57) ABSTRACT

In some embodiments of the present invention, a disk drive includes a rotatable data storage disk, a head, and a controller. The head is configured to fly on an air cushion relative to a data recording surface of the rotating disk while writing data to the data recording surface responsive to a write command from a host device or while reading data from the data recording surface to generate a read signal responsive to a read command from the host device. The controller is configured to measure flying height of the head relative to the data recording surface of the disk in response to sensing power-up of the disk drive and/or a shut-down command from the host device. The controller may measure the flying height in response to sensing power-up of the disk drive and, subsequent to measuring the flying height, may generate a ready signal to the host computer that indicates that the disk drive has powered-up and is ready to receive read/write commands from the host computer.

15 Claims, 5 Drawing Sheets

METHODS AND DISK DRIVE THAT MEASURE HEAD FLYING HEIGHT AT POWER-ON/OFF

RELATED APPLICATION

This application claims the benefit of and priority to U.S. Provisional Patent Application No. 60/725,025, filed Oct. 7, 2005, the disclosure of which is hereby incorporated herein by reference as if set forth in its entirety.

FIELD OF THE INVENTION

The present invention generally relates to disk drive data storage devices and, more particularly, to apparatus and methods for measuring read/write head fly height relative to a rotating disk of a disk drive.

BACKGROUND OF THE INVENTION

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks, and by maintaining narrower flying height gaps between the heads and the data storage surfaces. The flying height of a head can vary in response to air pressure changes in the disk drive, and in response to head temperature variations which can affect the distance that the tip of the head protrudes therefrom (i.e., pole-tip protrusion). Maintaining the head fly height within an acceptable range is becoming increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

Some prior art techniques for measuring flying height have included various read signal harmonic ratio measurement techniques and optical techniques, such as those disclosed in U.S. Pat. No. 4,777,544 and U.S. Pat. No. 7,038,875, both of which are incorporated by reference herein as if set forth in their entireties.

SUMMARY OF THE INVENTION

In some embodiments of the present invention, a disk drive includes a rotatable data storage disk, a head, and a controller. The head is configured to fly on an air cushion relative to a data recording surface of the rotating disk while reading/writing data on the data recording surface responsive to a read/write command from a host device. The controller is configured to measure flying height of the head relative to the data recording surface in response to sensing power-up of the disk drive and/or a shut-down command from the host device.

In some further embodiments, the controller measures the flying height of the head in response to sensing power-up of the disk drive and, subsequent to measuring the flying height, is configured to generate a ready signal to the host computer that indicates that the disk drive has powered-up and is ready to receive read/write commands from the host computer. To measure the flying height, the head may be positioned to read from a reference track on the disk and to measure the flying height based on amplitude of the read signal, such as based on a ratio of the amplitude of a first harmonic of the read signal to the amplitude of a higher order harmonic of the read signal.

By measuring the flying height in response to power-up of the disk drive and/or a shut-down command from the host device, the associated measurement process may be carried out with a negligible or no perceived effect on the performance of the disk drive. For example, by carrying out the fly height measurement during a time period between when the disk drive is powered-up and when it signals to the host device that it is ready to receive read/write commands therefrom, the disk drive can calibrate its operation to compensate for a significant change in operational altitude and without interfering with the subsequent response performance of the disk drive to read/write commands from the host device.

Some other embodiments of the present invention are directed to related methods of operating a disk drive that measure the flying height of the head in response to sensing power-up of the disk drive and/or a shut-down command from the host device.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
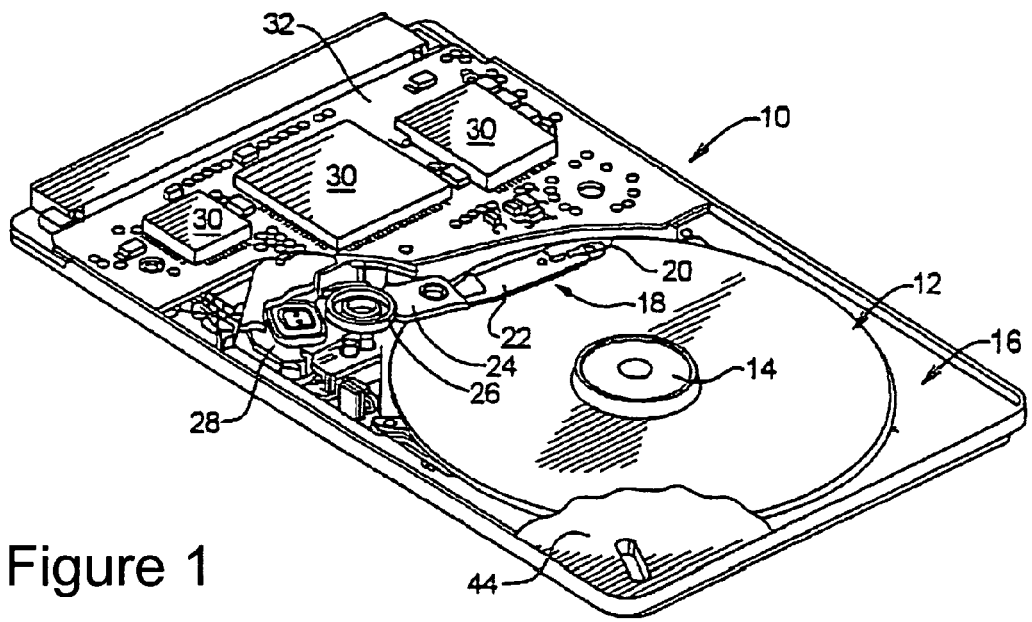
FIG. 1 is a perspective view of a disk drive with electronic circuits that are configured in accordance with some embodiments of the present invention.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator arm assembly 18 also includes a voice coil motor (VCM) 28 which moves the head 20 relative to the disk stack 12. The spindle motor 14 and actuator arm assembly 18 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 2:
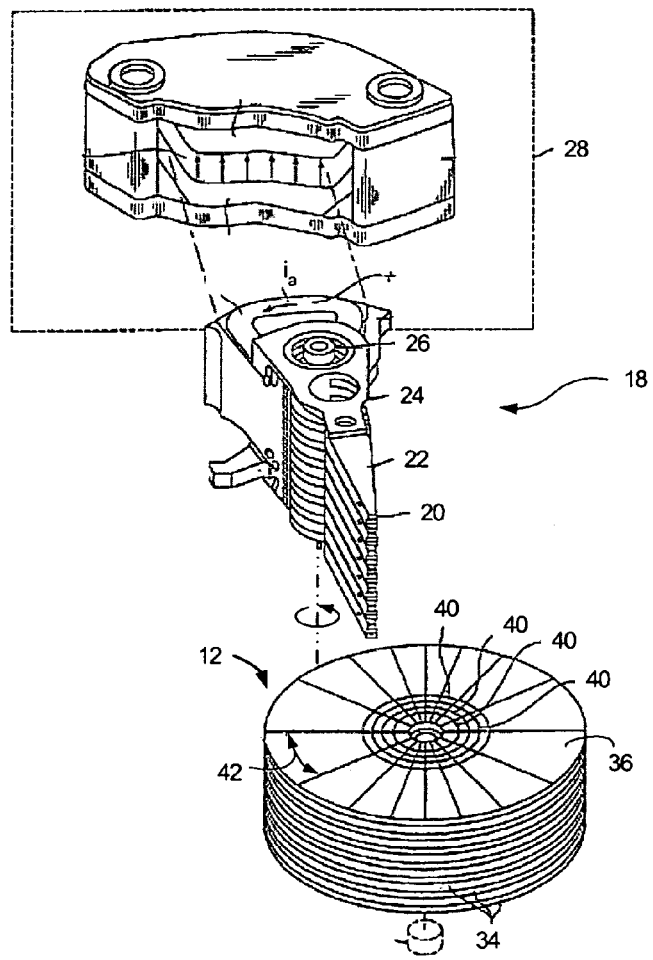
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 relative to their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. The data sectors are where non-servo related data (i.e., host device data) is stored and retrieved.

Figure 3:
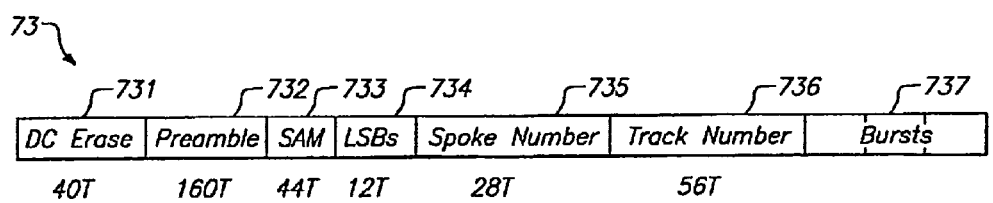
FIG. 3 is a block diagram of servo information fields in a servo sector.

FIG. 3 illustrates exemplary servo information 73 that may be stored in at least some of the servo sectors. The servo information 73 can include a DC erase field 731, a preamble field 732, a servo address mark (SAM) field 733, a track number field indicated by its least significant bits (LSBs) 734, a spoke number field 735, an entire track number field 736 which may be recorded in at least one of the servo sectors, and a servo burst field 737 of circumferentially staggered radially offset servo bursts (e.g., A, B, C, D servo bursts).

Figure 4:
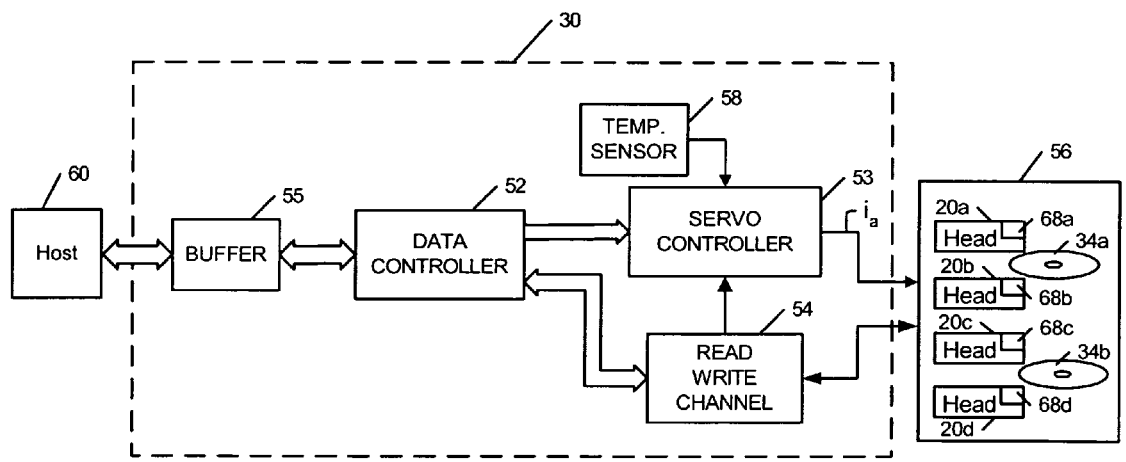
FIG. 4 is a block diagram of a portion of the controller and other electronic circuits of the disk drive shown in FIG. 1, and which are configured in accordance with some embodiments of the present invention.

FIG. 4 is a block diagram of host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although two separate controllers 52,53, buffer 55, and a read write channel 54 have been shown for purposes of illustration and discussion, it is to be understood that their functionality described herein may be integrated within a common integrated circuit package or distributed among more than one integrated circuit package. The head disk assembly (HDA) 56 can include a plurality of the disks 34a-b, the actuator arm assembly 18 with a plurality of heads 20a-d positioned adjacent to different data storage surfaces of the disks 34a-b, the VCM 28, and the spindle motor 14.

Write commands and associated data from the host device 60 are buffered in the buffer 55. The data controller 52 is configured to carry out buffered write commands by formatting the associated data into blocks with the appropriate header information, and to transfer the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

As explained above, it has become increasingly important in higher data storage density disk drives to be able to measure the flying height of a head relative to a disk's data storage surface so that the flying height may be maintained within an acceptable range and/or so that the operation of the disk drive may be adjusted to compensate for the measured fly height. The flying height of the head can change due to a change in altitude at which the disk drive is operated. Some embodiments of the present invention may arise from a recognition that many disk drives will be operated at only a few different altitudes during their lifetime. For example, a disk drive in a host desktop computer may be initially operated at an altitude of the location at which it is manufactured, then at an altitude of the location at which it is integrated within a desktop computer, and then again at an altitude of the end-user customer.

In accordance with some embodiments of the present invention, the disk drive 10 is configured to measure flying height of the head 20 relative to the data recording surface 36 in response to sensing power-up of the disk drive 10 and/or a shut-down command from the host device 60. By measuring the flying height in response to power-up and/or a shut-down command, the associated measurement process may be carried out with a negligible or no effect on the performance of the disk drive 10 as perceived by the host device 60.

For example, by carrying out the fly height measurement during a time period between when the disk drive 10 is powered-up and when it signals to the host device 60 that it is ready to receive read/write commands therefrom, the disk drive 10 can calibrate its operation to compensate for a change in operational altitude and without interfering with the subsequent response performance of the disk drive 10 to read/write commands from the host device 60. Some host computer operating systems allow a disk drive up to about 30 seconds after powering-up to signal that it is ready to receive read/write commands from the host computer, after which time the absence of a ready signal may be interpreted by the host computer as a disk drive error. Accordingly, the disk drive 10 may measure head fly height and calibrate its operation responsive thereto during the power-up response time window so as to be transparent to the host computer.

Figure 5A:
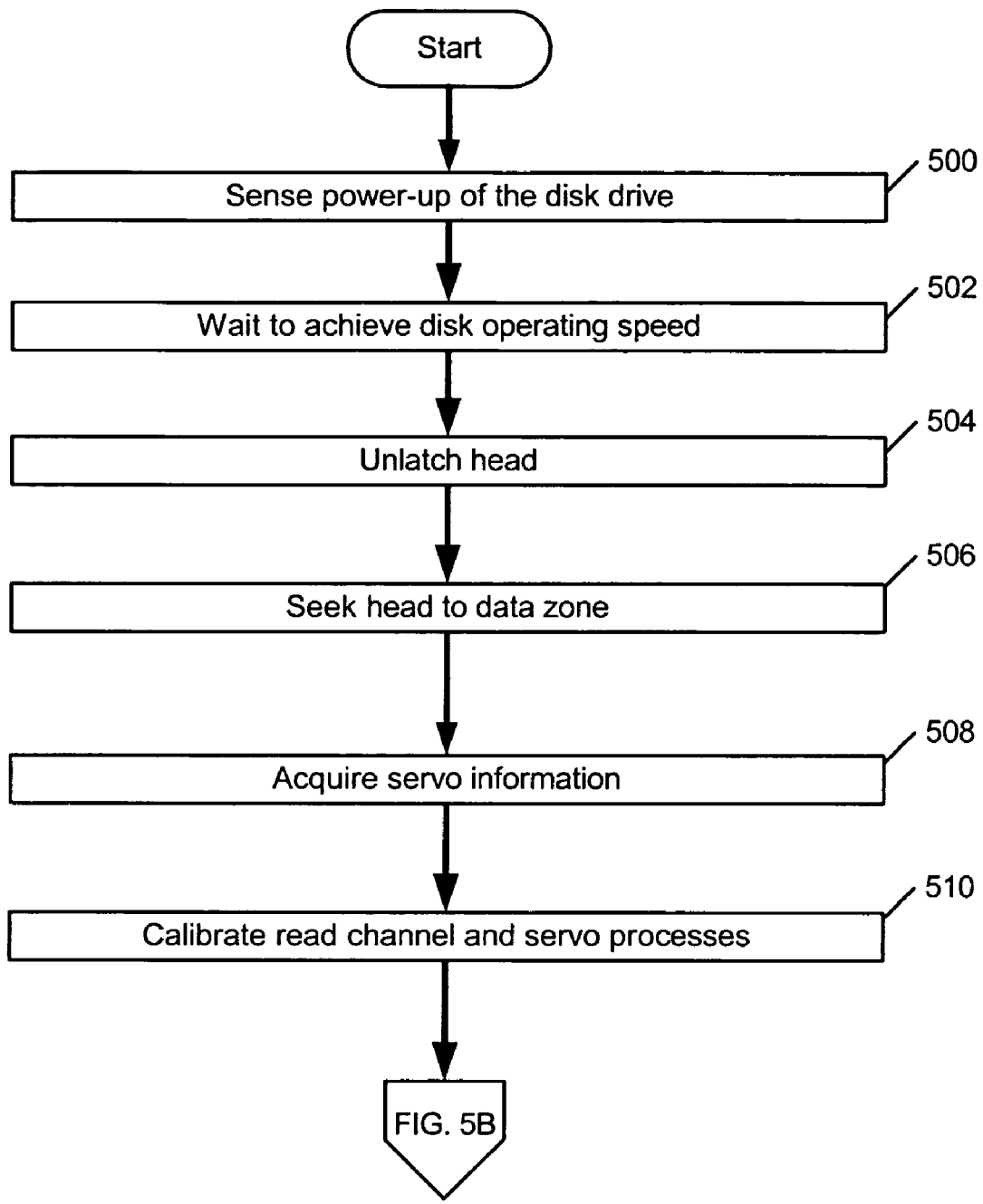
FIGS. 5A-B are flowcharts that show operations that measure head flying height in response to power-up of the disk drive in accordance with some embodiments of the present invention.
Figure 5B:
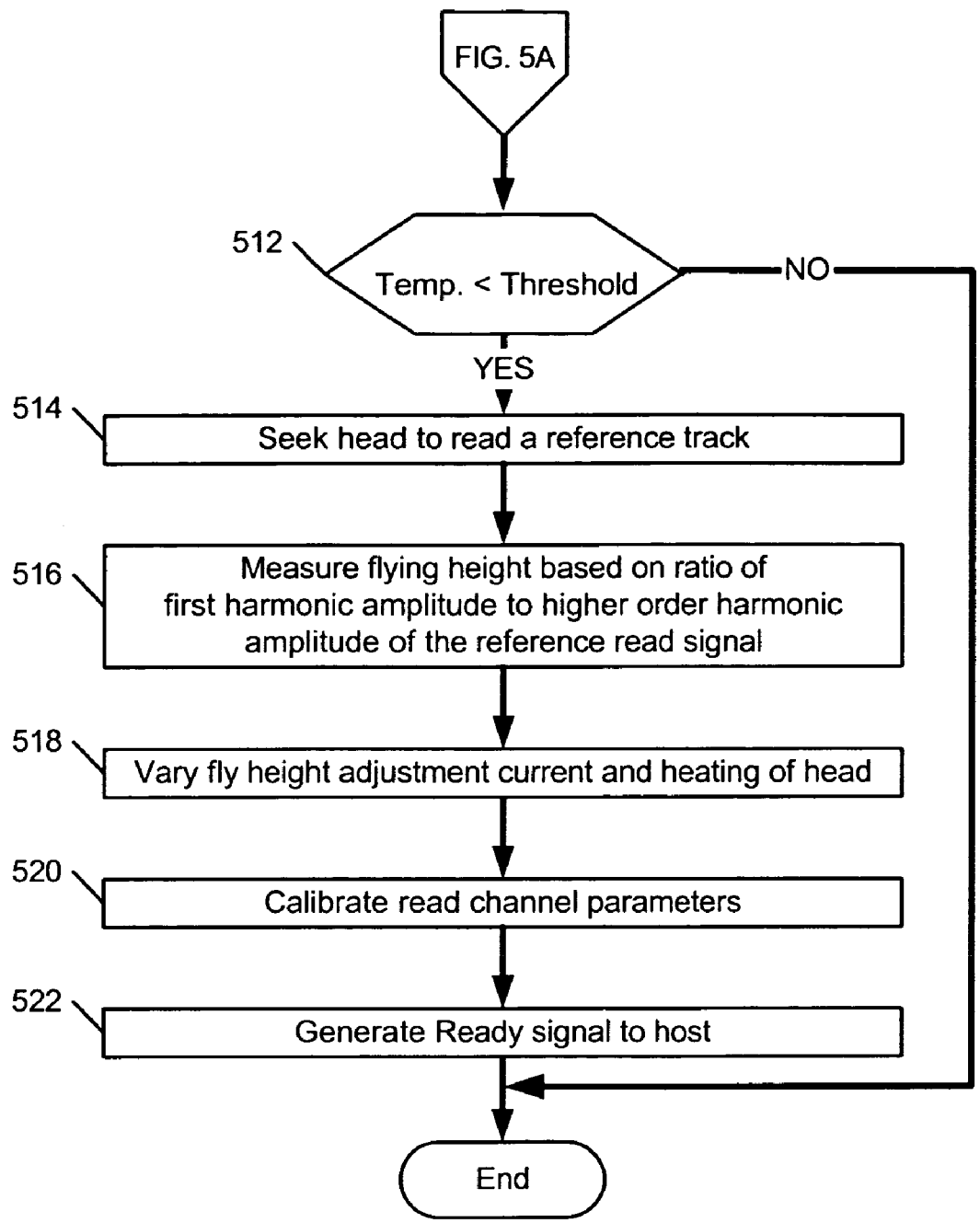

FIGS. 5A-B are flowcharts that illustrate operations that may be carried out to measure and compensate for head fly height as part of a power-up process of the disk drive 10. The controller 30 senses power-up of the disk drive 10 (Block 500), which may be sensed as an interrupt applied to the data controller 52 and/or the servo controller 53 when the supply voltage thereto reaches at least a threshold value. The controller 30 waits (Block 502) for the spindle motor 14 to spin-up the disks 34a-b to their operational speed, and the unlatches the heads 20a-d (Block 504) from a head latch mechanism. The head latch mechanism latch can be configured to releaseably latch the heads and prevent their movement onto the data storage surfaces of the disk 34a-b while the disks 34a-b are at rest. The controller 30 (e.g., servo controller 53) seeks the heads 20a-d (Block 506) to a data zone on the disks 340a-b, and reads (acquires) servo information (Block 508) from one or more servo sectors thereon. In response to defined fields of the servo information, the controller 30 calibrates (Block 510) the filter coefficients, equalization parameters, and/or amplification parameters that are used by the read write channel 54, the servo controller 53, and/or the data controller 52 to process the read/write signals from the heads 20a-d.

As shown in FIG. 4, the disk drive 10 may include a temperature sensor 58 which generates a temperature signal that is indicative of temperature within the disk drive 10, such as the ambient air temperature in the disk drive. In some embodiments, the controller 30 may selectively carry out a head fly height measurement upon power-up when the temperature signal indicates that the disk drive 10 has not been recently shut down. For example, the servo controller 53 may compare the temperature signal to a threshold value (Block 512), and carry out fly height measurement on one or more of the heads 20a-d when the temperature signal is less than the threshold value. In this manner, the controller 30 may avoid unnecessary repetition of fly height measurements over a relatively short period of time when the temperature of the disk drive 10 indicates that it was recently shut-off and, therefore, is unlikely to have experienced a significant change in altitude since the last fly height measurement and associated calibration. Thus, the controller 30 may use the temperature signal to determine when the disk drive 10 has been recently powered off and then back on, such as in response to a series of alternating shut-down commands triggered by a power savings application on the host device 60 and power-up events triggered by pending read/write commands by the host device 60.

To measure head fly height, the controller 30 (e.g., servo controller 53) may seek (Block 514) at least one of the heads 20a-d to a defined reference track and read therefrom to generate a reference read signal. The reference track may be defined along an inner diameter portion of at least data storage surface of one of the disks 34a-b, because the head fly height along an inner diameter of a disk can be more sensitive to altitude variation. The reference read signal may be generated by reading a known pattern within the servo information 73 stored in one or more of the servo sectors, such as within the preamble field 732 (FIG. 3). The controller 30 may then determine the fly height of a selected head based on amplitude of the reference read signal. For example, the reference read signal can contain a first harmonic frequency and higher order harmonic frequencies. The controller 30 may measure the fly height of the selected head based on a ratio of the first harmonic of the reference read signal to the amplitude of at least one higher order harmonic (e.g., third harmonic frequency) of the reference read signal (Block 516), such as based on an equation that is known in the industry as the Wallace equation.

Because the head fly height measurement may be carried out to compensate for altitude variation of the disk drive, it may be sufficient to measure the fly height of a single one of the heads 20a-d by reading at least a portion of the reference track with that single head along a corresponding single data storage surface of the corresponding disk. The measured fly height for the single selected head may then be used to vary the fly height of all of the heads 20a-d and/or to calibrate the processing of the read/write signals from/to all of the heads 20a-d. Measuring the fly height of a single one of the heads 20a-d can be carried out more quickly than measuring the fly height of all of the heads 20a-d, which may allow the measurement to be carried within an acceptable time allowed for the power-up and/or shut-down process of the disk drive 10.

The measured fly height of a selected head may be used by the controller 30 (e.g., the servo controller 53) to adjust the fly height of the selected head or all of the heads 20*a*-*d*. For example, the heads 20*a*-*d* may include heater elements 68*a*-*d* (FIG. 4). The controller 30 may generate fly height adjustment currents that control heating of the heads 20*a*-*d* by the heater elements 68*a*-*d*. The fly height adjustment currents are used to vary thermally-induced elastic deformation of the heads 20*a*-*d* to vary their respective fly heights. The controller 30 may vary the fly height adjustment currents (Block 518) to change the temperature of the heads 20*a*-*d* and their respective flying heights relative to the data recording surface of the disks 34*a*-*b*. The controller 30 may also use the measured fly height of a selected head to calibrate (Block 520) filter coefficients, equalization parameters, and/or amplification parameters that are used by the read write channel 54, the servo controller 53, and/or the data controller 52 to process the read/write signals from/to the heads 20*a*-*d*.

The controller 30 may then generate a ready signal to the host device 60 (Block 522) to indicate that the disk drive 10 has powered-up and is ready to receive read/write commands from the host device 60. Because the head fly height measurement, adjustment, and calibration can be carried out in the disk drive 10 before it signals the host device 60 that it is ready to receive read/write commands, these operations may be carried out without interfering with the responsiveness of the disk drive 10 to read/write commands from the host device 60.

Figure 6:
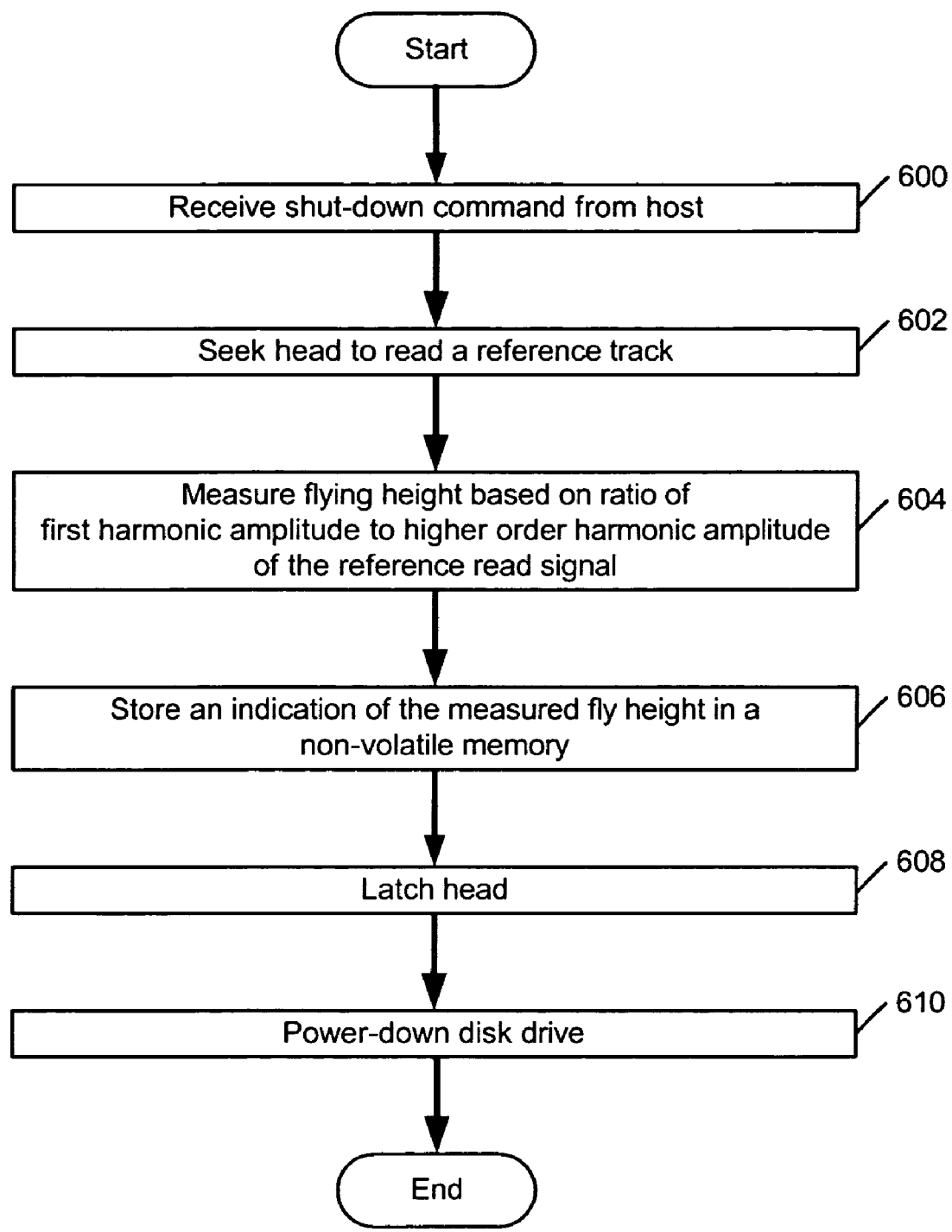
FIG. 6 is a flowchart showing operations that measure head flying height in response to a power-down command, and that store an indication of the measured fly height into a non-volatile memory of the disk drive in accordance with some embodiments of the present invention.

Referring now to FIG. 6, a block diagram is provided that illustrates operations that may be carried out to measure head fly height as part of a shut-down process of the disk drive 10. The controller 30 receives a shut-down command (Block 600) from the host device 60. The controller 30 seeks at least one of the heads 20*a*-*d* to read a reference track (Block 602) and generate a reference read signal therefrom. The controller 30 may measure the head fly height based on a ratio of the amplitude of a first harmonic frequency of the reference read signal to a higher order harmonic of the reference read signal (Block 604). The controller 30 stores an indication of the measured fly height in a non-volatile memory (Block 606), such as within a non-volatile memory of the data controller 52, the servo controller 53, and/or the read channel 54. The heads 20*a*-*d* are moved (Block 608) to a latch mechanism. The disk drive 10 is then powered-down (Block 610). Because the head fly height measurement is carried out in response to receiving a shut-down command from the host device 60, the measurement process may be carried out at a time when no further read/write commands are expected to be received from the host device 60 and, consequently, may be carried out transparently to the operation of the host device 60.

Upon power-up of the disk drive 10, the controller 30 may retrieve the indicated fly height measurement from the non-volatile memory and use that value to vary the fly height of the heads 20*a*-*d* and/or to calibrate the filter coefficients, equalization parameters, and/or amplification parameters that are used by the read write channel 54, the servo controller 53, and/or the data controller 52 to process the read/write signals from/to the heads 20*a*-*d*, such as was described with regard to Blocks 518 and 520 of FIG. 5B.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a rotatable data storage disk including servo information in servo sectors defined thereon;
   a head that is configured to fly on an air cushion relative to a data recording surface of the rotating disk; and
   a controller that measures the flying height of the head relative to the data recording surface in response to sensing power-up of the disk drive and, subsequent to measuring the flying height, is further configured to generate a ready signal to a host computer that indicates that the disk drive has powered-up and is ready to receive read/write commands from the host computer.

2. The disk drive of claim 1, wherein the controller is further configured to measure the flying height of the head as part of a process for reading servo information from servo sectors to calibrate the read channel upon power-up of the disk drive and before the controller generates the ready signal to the host computer that indicates that the disk drive has powered-up and is ready to receive read/write commands from the host computer.

3. The disk drive of claim 1, further comprising a temperature sensor that is configured to generate a temperature signal that is indicative of temperature within the disk drive, and wherein the controller is further configured to selectively carry out measurement of the flying height of the head upon power-up of the disk drive when the temperature signal indicates that the disk drive has not been recently shut down.

4. The disk drive of claim 3, wherein the controller is further configured to compare the temperature signal to a threshold value and to carry out the measurement of the flying height of the head upon power-up of the disk drive when the temperature signal is less than the threshold value.

5. The disk drive of claim 1, wherein the head comprises a heating element that variably heats the head responsive to a fly height adjustment current, and the controller is further configured to vary the fly height adjustment current to change the temperature of the head and its resulting flying height relative to the data recording surface in response to the measured flying height of the head and before the controller generates the ready signal to the host computer.

6. A disk drive comprising:
   a rotatable data storage disk including servo information in servo sectors defined thereon;
   a head that is configured to fly on an air cushion relative to a data recording surface of the rotating disk; and
   a controller that measures the flying height of the head relative to the data recording surface in response to sensing a shut-down command from a host computer, and stores an indication of the measured flying height of the head in a non-volatile memory before powering down the disk drive in response to the sensed shut-down command.

7. A disk drive comprising:
   a rotatable data storage disk including servo information in servo sectors defined thereon;
   a head that is configured to fly on an air cushion relative to a data recording surface of the rotating disk; and
   a controller that measures flying height of the head relative to the data recording surface of the disk in response to sensing power-up of the disk drive and/or a shut-down command from a host computer, and measures flying height of the head by controlling the head to read at least a portion of a reference track on the data storage surface to generate a reference read signal, and by measuring the flying height based on a ratio of the amplitude of a first harmonic of the reference read signal to the amplitude of at least one higher order harmonic of the reference read signal.

8. The disk drive of claim 7, wherein the controller is further configured to measure the flying height of the head by reading the reference track along an inner diameter portion of the disk.

9. The disk drive of claim 7, wherein the head comprises a heating element that variably heats the head responsive to a fly height adjustment current, and the controller is further configured to vary the fly height adjustment current to change the temperature of the head and its resulting flying height relative to the data recording surface in response to the measurement of the flying height of the head.

10. A method of operating a disk drive that includes a rotatable data storage disk and a head configured to fly on an air cushion relative to a data recording surface of the rotating disk while reading/writing data on the data recording surface, the method comprising:

sensing power-up of the disk drive;

measuring flying height of the head in response to sensing power-up of the disk drive; and subsequent to measuring the flying height, generating a ready signal to the host computer that indicates that the disk drive has powered-up and is ready to receive read/write commands from the host computer.

11. The method of claim 10, wherein the disk drive comprises a temperature sensor that is configured to generate a temperature signal that is indicative of temperature within the disk drive, and the method further comprises selectively carrying out measurement of the flying height of the head upon power-up of the disk drive when the temperature signal indicates that the disk drive has not been recently shut down.

12. The method of claim 10, wherein the head comprises a heating element that variably heats the head responsive to a fly height adjustment current, and the method further comprises, before generating the ready signal to the host computer, varying the fly height adjustment current to change the temperature of the head and its resulting flying height relative to the data recording surface in response to the measured flying height of the head.

13. The method of claim 10, wherein the head comprises a heating element that variably heats the head responsive to a fly height adjustment current, and the method further comprises, before generating the ready signal to the host computer, varying the fly height adjustment current to change the temperature of the head and its resulting flying height relative to the data recording surface in response to the measured flying height of the head.

14. A method of operating a disk drive that includes a rotatable data storage disk and a head configured to fly on an air cushion relative to a data recording surface of the rotating disk, the method comprising:

sensing a shut-down command from a host computer;

measuring flying height of the head in response to sensing the shut-down command; and storing an indication of the measured flying height of the head in a non-volatile memory before powering down the disk drive in response to the sensed shut-down command.

15. A method of operating a disk drive that includes a rotatable data storage disk and a head configured to fly on an air cushion relative to a data recording surface of the rotating disk, the method comprising:

measuring flying height of the head relative to the data recording surface of the disk in response to sensing power-up of the disk drive and/or a shut-down command from a host computer by reading at least a portion of a reference track on the data storage surface to generate a reference read signal, and measuring the flying height based on a ratio of the amplitude of a first harmonic of the reference read signal to the amplitude of at least one higher order harmonic of the reference read signal.

* * * * *